United States Patent [19]

Wilson

[11] 3,825,087

[45] July 23, 1974

[54] MOTORIZED AGRICULTURAL TYPE CARRIER

[76] Inventor: William A. Wilson, 815 Woodland Ave., Woodland, Calif. 95695

[22] Filed: Aug. 24, 1973

[21] Appl. No.: 391,042

[52] U.S. Cl.................... 180/6.48, 180/45, 180/51, 180/66, 280/408
[51] Int. Cl............................................ B62d 49/40
[58] Field of Search .............. 180/6.3, 6.48, 14, 44, 180/45, 46, 47, 48, 49, 50, 51, 52, 54 C, 54 D, 54 E, 54 F, 62, 66, 77 S; 280/5 A, 408; 301/38, 39, 5

[56] References Cited
UNITED STATES PATENTS

| | | | |
|---|---|---|---|
| 3,469,381 | 9/1969 | Burrough et al................. | 180/6.3 X |
| 3,606,161 | 9/1971 | Paul................................. | 180/66 X |
| 3,664,448 | 5/1972 | Hudis............................... | 180/9.46 |
| 3,690,395 | 9/1972 | Spiller et al...................... | 180/6.48 |

*Primary Examiner*—M. Henson Wood, Jr.
*Assistant Examiner*—Gene A. Church
*Attorney, Agent, or Firm*—Alexander & Dowell

[57] ABSTRACT

A carrier vehicle useful for agricultural or industrial purposes, the vehicle having a large flat platform for carrying equipment and materials, and also capable of supporting various farm implements in operative positions, the platform comprising a frame supporting motor-driven ground engaging wheels in its corners each carried by an adjustable-height caster assembly, the width of the frame being power-adjustable and all four wheels being selectively power-steered, the frame carrying engine-driven pumps supplying hydraulic fluid to the wheel motors, to the frame expansion means, and to the steering means through a series of control valves clustered in a locker in the frame, and the vehicle having a rotatable operators cab connected by flexible control cables to the control valves in the frame.

13 Claims, 10 Drawing Figures

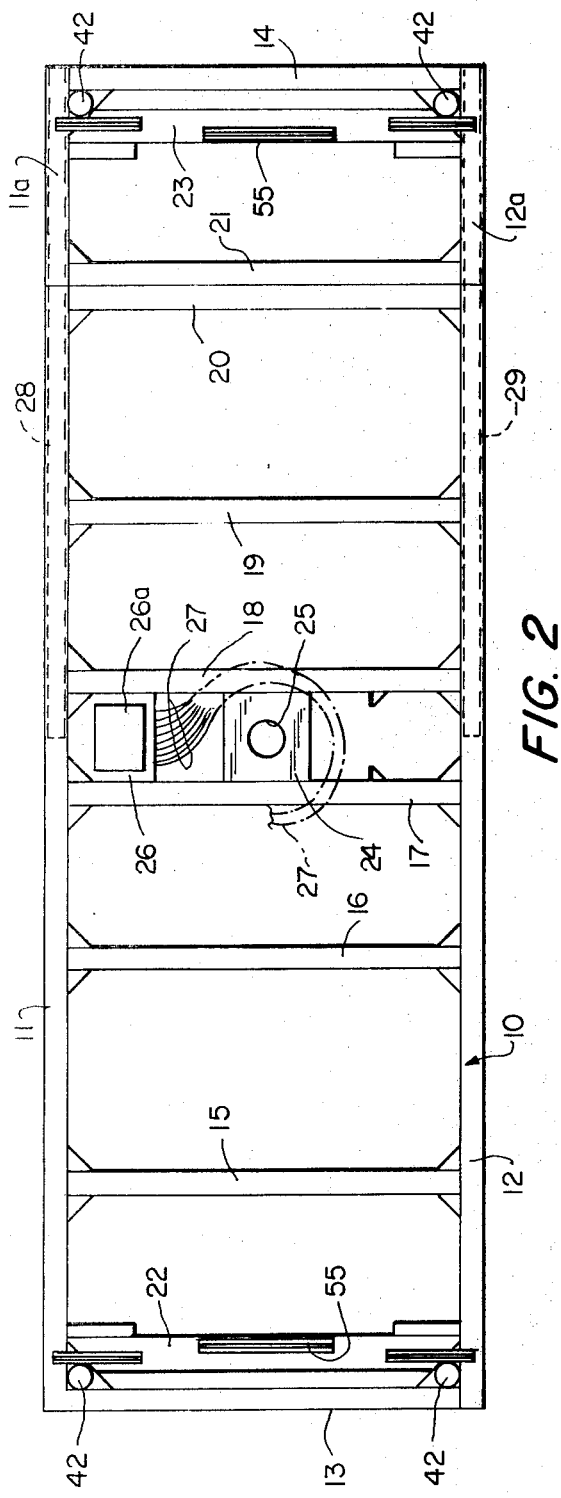
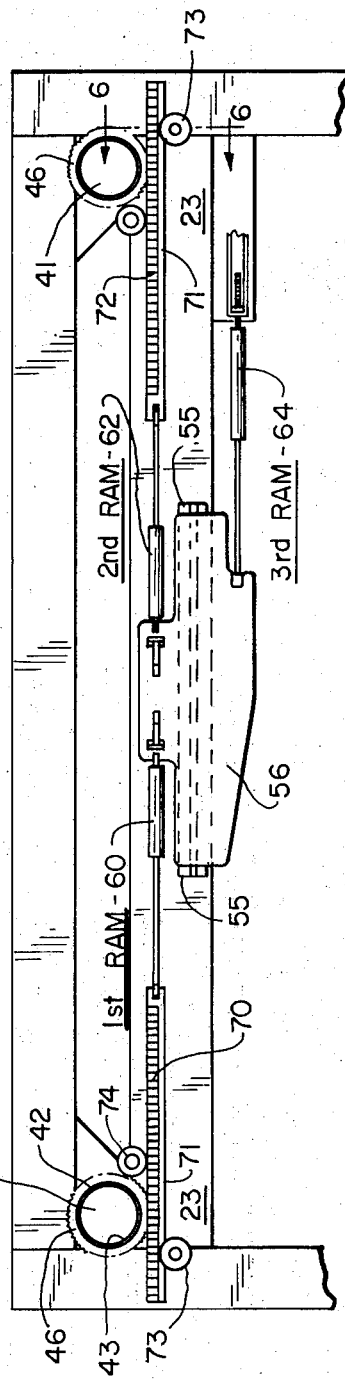
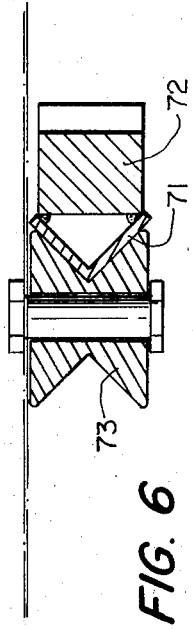
FIG. 2
FIG. 5
FIG. 6

MOTORIZED AGRICULTURAL TYPE CARRIER

FIELD OF INVENTION

This invention relates to a carrier vehicle of a type useful for agricultural or industrial purposes, and more particularly relates to a carrier vehicle improved as to its steering and drive structure and as to its controls so as to increase its operational versatility as well as its ease of maintenance.

PRIOR ART

The prior art shows a number of vehicles having general features of construction and utility in common with the present disclosure, for example as shown in U.S. Pats. Nos. 3,690,395; 3,666,178; 3,664,448; 3,635,004; 3,305,116 and 2,590,677 which variously show a frame supporting four wheels which can be turned to permit the vehicle to be driven and steered in any direction, selectibel four-wheel drive, a rotatable operators cab, etc. This disclosure teaches and claims novel improvements over these and other prior art showings.

OBJECTS OF THE INVENTION

It is the principal object of this invention to provide an improved carrier-type vehicle in which the vehicle frame comprises a large platform capable of supporting not only the mechanism necessary for the propulsion and control of the vehicle itself, but also capable of supporting diverse farm implements and attachments, such as sprayers, planters, fertilizing attachments, etc. As is the case with some of the vehicles of this general type shown in the prior art, several of the main features of the present vehicle include the concept of having a large mobile platform which carries all of the necessary farm implements and sacks or tanks of chemicals, as distinguished from providing a vehicle which tows a separate platform of this type; and the concept of providing a carrier which requires no headlands in which to turn around at the end of each pass of the vehicle across a field. These, and other considerations such as ground-clearance adjustments, ease of steering in an open field, and lack of a tendency to bog down are some of the objects shared in common with the known prior art.

It is a more specific object of this invention to provide a carrier vehicle of the type recited in which substantially all functions of the vehicle are hydraulically actuated and controlled by improved hydraulic valve circuitry, one important feature of the present invention being the location of all hydraulic circuitry and control valves in the frame itself, and the utilizing of Bowden-wire-type control cables extending from the control valves located in the frame to a separate operators cab so that there is no oil circuitry whatever located within the cab. A corollary object of the invention is to arrange the hydraulic lines and control valves neatly in one or more valve lockers which are disposed to lie flat between the frame members so that the entire hydraulic circuitry is easily and immediately accessible for servicing by merely opening covers located on the surface of the frame itself, none of the circuitry being hidden or located inaccessibly within the driver's cab.

Another major object of the invention is to provide a novel steering system in which the wheels located at each of the narrow ends of the frame are paired for control purposes, and each pair is steered by three hydraulic rams attached to a slide member which is reciprocable across the same end of the frame. A first and a second hydraulic ram are respectively connected to the slide member, and these rams separately extend to control the direction of each wheel in the pair. Conversely, a third hydraulic ram is controlled to move the slide member itself back and forth across the end of the frame, thereby turning the wheels in the pair in unison. These hydraulic rams are controlled by corresponding steering valves located in the valve locker and arranged such that the wheels located at either narrow end of the frame can be steered in unison when the vehicle is moving endwise in the manner of an automobile, or alternatively the wheels on either longer side of the frame can be turned in unison to provide steering of the frame when it is moving broadside, for instance, when travelling down a field performing some agricultural function. In the latter case, movements of the said first rams would control steering at one of the longer sides of the frame, and movements of the said second rams would control steering motions of the wheels at the other longer side of the frame. These steering motions are performed in the presently illustrated embodiment by rack and pinion means attached respectively to said first and second rams.

It is another object of the invention to provide a carrier vehicle of the type discussed in which a caster assembly supporting a ground-engaging wheel is located in each of the four corners of the vehicle frame, and each caster assembly includes a vertically extending journal shaft which passes through a journal bearing including a sleeve which is rotatably located in the corner of the vehicle. The position of the sleeve and the caster is controlled as to its direction by said rack and pinion steering means, and the height of the journal shaft in the sleeve is adjustable and lockable to control the ground-clearance of the vehicle to adapt it for use in connection with different crops or with different functions performed on the same crops.

It is another object of the invention to provide an hydraulic motor located in the lower end of each caster means with the motor supporting the ground-engaging wheel, and said hydraulic motor driving the associated wheel from a source of fluid pressure is applied thereto under the control of suitable drive valves. The drive valve control system is constructed such that by selection using a multiple position valve any one of several combinations can be had for drive purposes, i.e. by combining the wheels in pairs for drive purposes. Another control valve is then operable to select the speed and direction of drive of the wheels once they have been selected. Another related improvement resides in the fact that two separate engines are used which are located upon the frame in a symmetrical manner with respect to its center for balance purposes, and one engine is connected to drive a pump supplying oil pressure to one set of drive wheels, whereas the other engine is connected to drive a pump supplying pressure to the wheels at the other end of the frame, whereby when the vehicle is being driven along a highway endwise, only one of the engines need be run in order to supply the necessary drive to one pair of wheels. In a preferred embodiment of the invention, each engine drives two separate pumps, and one pump on each engine drives the pair of wheels located at the same end of the frame, whereas the other pump on one engine performs all of the steering functions and the other pump on the other engine performs the cab rotating function. The pumps are so connected by the hydraulic circuit that one engine can be run to perform both the steering and driving functions necessary to transport the vehicle endwise, for instance, along a highway between fields.

A further object of the invention is to provide an improved frame in which one end of the frame including one pair of wheels and the steering assembly thereat is telescopically connected to the remainder of the frame, and hydraulic ram means are provided to control the expansion or contraction of the frame. The advantage of this structure is to permit the width of the vehicle when it is moving broadside along a field to be controlled so as to place the wheels accurately between adjacent rows of plants, thereby making the vehicle quickly adaptable to operations performed on various different types of plants which are planted with different row spacings. 3.

Other objects and advantages of the present invention will become apparent during the following discussion of the drawings, wherein:

THE DRAWINGS

FIG. 2 is a plan view of the vehicle frame, showing the operators cab mounting hole in the center and the control valve locker adjacent to it with control cables coming from the locker;

FIG. 5 is a detail view of the three-ram steering mechanism which is located at each end of the frame;

FIG. 6 is an enlarged detail view taken along line 6—6 of FIG. 5;

Figure 1:
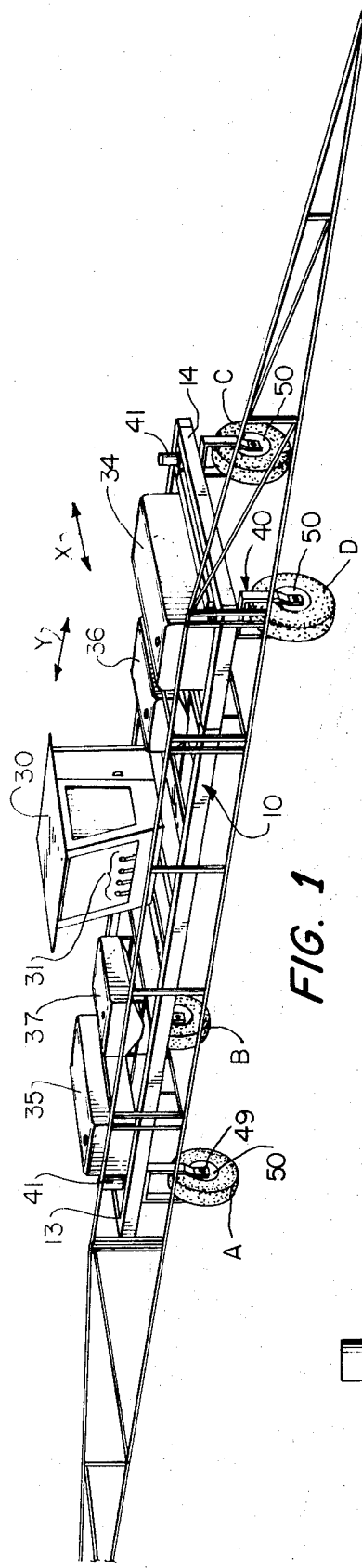
FIG. 1 is a perspective view of an illustrative embodiment of a carrier vehicle according to the invention showing it fitted with a field spraying attachment.

Referring now to the drawings, FIG. 1 is a perspective view of an illustrative embodiment of the carrier vehicle according to the present invention, this particular embodiment showing the vehicle fitted with an array of spraying pipe, although there are many other implements and attachments that can be substituted in place thereof, in a manner which is well known in the agricultural art.

Figure 3:
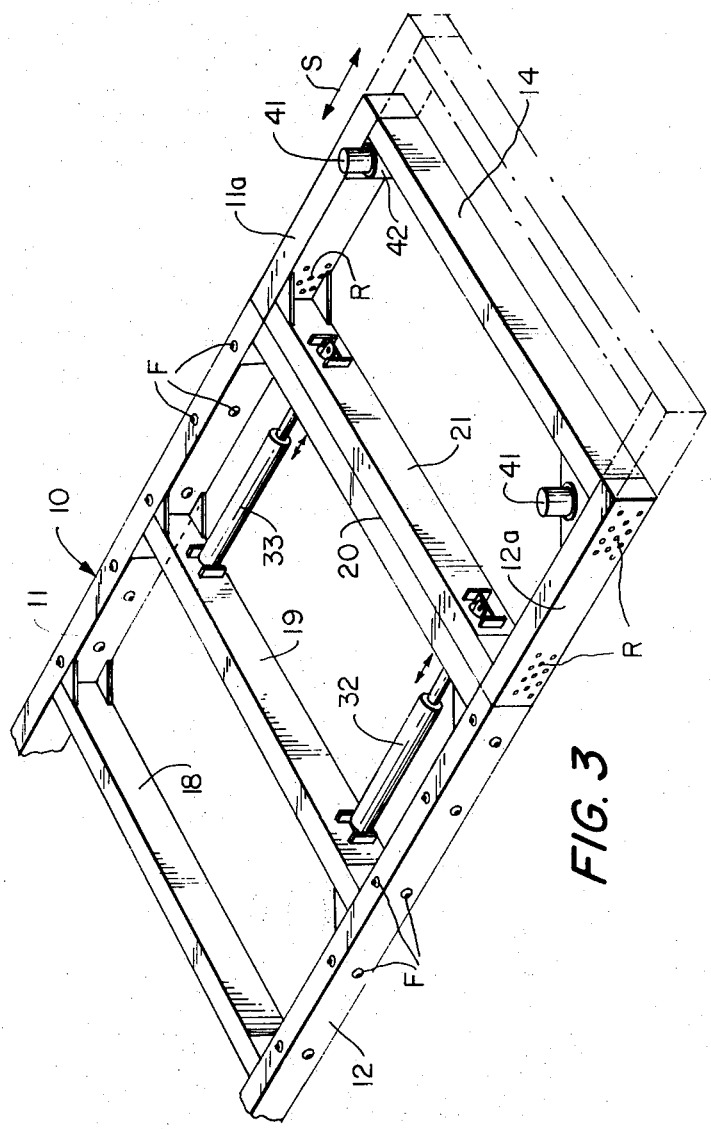
FIG. 3 is a perspective view of one end of the frame which is capable of elongating telescopically with respect to the remainder of the frame.

As best illustrated in FIGS. 1, 2, and 3, the vehicle itself comprises a frame 10 forming a large horizontal platform which can then be fitted with suitable farm implements according to the particular type of work to be done. The embodiment presently illustrated comprises a frame which is 10 feet wide and 30 feet long over-all, the frame comprising two longer side members 11 and 12 and two shorter side members 13 and 14. For present descriptive purposes, the vehicle is described as travelling broadside when it is moving in the direction of the arrow X and is described as moving endwise when travelling in the direction of the arrow Y in FIG. 1.

As can be seen in FIG. 2, the frame has a number of transverse reinforcing members, 15, 16, 17, 18, 19, 20 and 21 and is further provided with cross-members 22 and 23 which support part of the steering mechanism which will be hereinafter described in greater detail. Betweeen the cross members 17 and 18 there is located a bearing plate 24 having a hole 25 in its center in which the operators cab 30 is journaled for rotation in a manner to be hereinafter described. Also between the two cross members 17 and 18 there is located a valve locker 26 having a lid 26a which can be opened for access to the control valves which are located within the locker 26 lying flat between the two cross members 17 and 18. These control valves are best illustrated in FIGS. 7, 8, 9 and 10 and will be discussed in connection therewith, but for present purposes, it suffices to say that all of the hydraulic circuitry including the control valves is located within the frame 10. There is a cluster of control cables 27 coming out of the locker 26 toward the bearing plate 24, and these cables are wound generally around the journal supporting the cab in the hole 25 and extend upwardly from below into the bottom of the cab and connect within the cab to a number of control levers generally referred to by the reference numeral 31, FIG. 1. The operator uses these levers to control the valves within the locker 26 in order to control substantially all of the power driven functions of the carrier vehicle. These flexible cables 27 are of the Bowden-wire type and are coiled substantially around the journal on which the cab 30 is pivoted in such a manner that the cab can be rotated through an angle of about 360°, without unduly straining the control cables 27. Thus, the cab can be placed in any position, but cannot be continuously rotated beyond the 360 degree point. Nevertheless, it is more practical to have Bowden-wire type cables extending from the chassis to the control cab 30 than to locate the hydraulic valves in the cab and have hydraulic tubing extending between the cab and the frame.

The frame 10 also supports the sources of fluid pressure, which must operate all of the functions of the vehicle as well as drive it, and the sources of fluid pressure comprise two separate engines 34 and 35 together with their accompanying fuel tanks 36 and 37 which are all symmetrically located on the frame 10 for proper balance of the vehicle as well as substantially uniform weight distribution on the various wheels.

Figure 4:
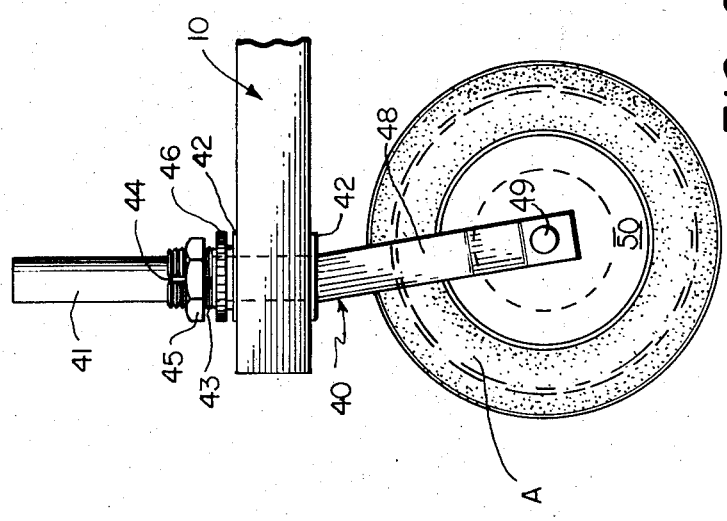
FIG. 4 is an enlarged view of the caster assembly journaled in each corner of the frame and supporting an hydraulic motor driving a ground engaging wheel.

The vehicle rides on four ground engaging wheels each of which is mounted upon a caster assembly 40 as is best seen in FIG. 4. The caster assembly 40 each has a vertically extending journal shaft 41 extending upwardly through a journal bearing 42 mounted in each corner of the frame 10 and comprising a fixed outer bearing sleeve 42 and an inner bearing sleeve 43 which is rotatable within the outer sleeve 42. The inner sleeve 43 extends upwardly above the frame 10 and is split as at 44 at its upper end. A locking nut 45 is screwed down upon tapered threads at the upper end of the sleeve 43 so as to compress the sleeve 43 tightly upon the journal shaft 41 and lock the latter within the sleeve 43, both for the purpose of maintaining the ground-clearance height adjustment of the vehicle by preventing the journal shaft 41 from being displaced vertically within the sleeve 43 and also for the purpose of causing the journal shaft 41 to rotate whenever the sleeve 43 is rotated as will be seen hereinafter under the description of the means by which the vehicle is steered. The sleeve 43 also ahs a pinion 46 fixedly attached to it and this pinion is rotated by a rack mechanism which will presently be described in connection with FIGS. 5 and 6. When the pinion 46 is rotated, it also rotates the sleeve 43 and therefore rotates the entire caster assembly 40.

Each caster assembly 40 has two downwardly extending legs 48 which are provided with mounting holes 49 at their lower ends. These holes support the stub shafts of hydraulic motors 50 which motors in turn support the ground engaging wheels A, B, C, and D. The four hydraulic motors 50 are all identical and are readily available on a commercial basis. A particularly satisfactory motor for this purpose is made by the Bird-Johnson Company of Walpole, Mass., the motor being described in their Bulletin No. GC-5-71. These motors are used variously on oil rigs, cranes, heavy machinery mills, etc., and include a model which is designed to support a vehicle wheel, the motor being provided with wheel mounting lugs on its periphery. The model 2150 motor is the one contemplated for the present purpose, and this motor is shaped somewhat in the manner of an ordinary vehicle brake drum assembly. If desired, the lower end of each leg 48 of the caster assembly can be split at the mounting hole 49 so as to facilitate removal of the motor and the wheel, for instance, for the purpose of changing a pneumatic tire.

The caster assemblies 40 including the motor 50 and the frame mounting journal are identical in all four corners of the vehicle and similar parts thereof are marked with similar reference characters except that the ground engaging wheels themselves have been labelled A, B, C, and D in the four corners of the vehicle frame since these wheels need to be separately referred to while describing the various control functions shown in the circuitry diagrams of FIGS. 7 through 10 inclusive.

Referring to FIG. 3, this figure shows the right-hand end of the vehicle frame 10 for the purpose of illustrating the expansible feature of that end of the frame. The frame is made out of rectangular cross-section tubing and smaller-size rectangular tubing members 28 and 29, FIG. 2, are slipped into the right-hand end of the frame and fixed therein, perhaps by rivets R. The left-hand ends of the smaller tubings 28 and 29 slide freely within the frame members 11 and 12 and their sliding is assisted by a series of lubrication fittings F mounted in the four sides of the frame members 11 and 12. Thus, the portion of the frame including the frame members 11a, 12a, 14, and 21 can slide in and out in the direction of the arrow S, and for this purpose two hydraulic cylinders or rams 32 and 33 are provided between the stationary cross member 19 and the movable cross member 21. The circuitry for these cylinders is illustrated and described hereinafter in connection with FIG. 9.

Figure 7:
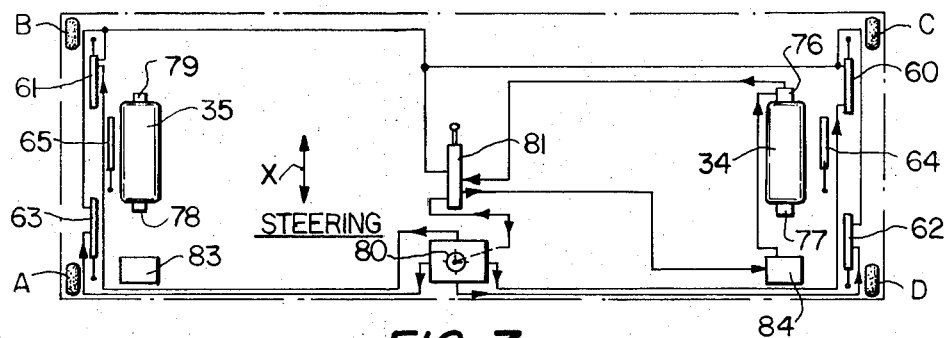
FIGS. 7 and 8 are schematic views of the hydraulic circuitry for steering the vehicle, respectively, when moving broadside and when moving endwise.
Figure 8:
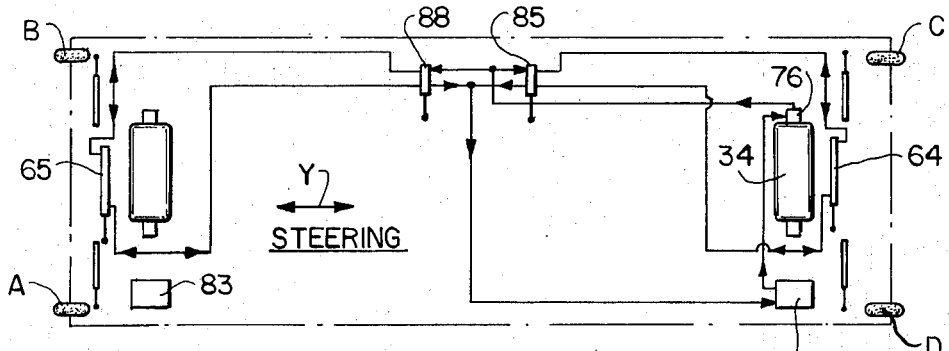

The mechanism by which the vehicle steering functions are controlled can be seen best in FIGS. 5, 6, 7, and 8. FIG. 5 shows the right-hand end of the frame 10 when oriented as shown in FIG. 1, although the left-hand end is the same for steering purposes, and the ends of the frame include cross members 22 and 23 which support a guide track 55 as best seen in FIGS. 2 and 5. Each guide track 55 supports for reciprocation lengthwise of the track a slide member 56 which can move back and forth cross-wise of the vehicle frame 10. As shown in FIGS. 5, 7 and 8 each slide member has three hydraulic pistons connected to it. The respective pistons can be described as first rams 60 and 61, second rams 62 and 63, and third rams 64 and 65. From a further inspection of FIG. 5 it will be apparent that the rams 60 and 62 are respectively connected to racks 70 and 72 which engage the opposite pinions 46 on the rotatable inner sleeve members 43. The racks are each connected by welding to an angle iron 71 as can best be seen in FIG. 6, and the angle iron runs in the groove of a similarly shaped idler 73 which holds the rack 70 into engagement with the pinion 46. Another idler 74 can be provided on the other side of the rack to reduce the wear between the rack and pinion by maintaining the root-diameter spacing of the teeth.

Referring to FIG. 5, when the first ram 60 is moved back and forth, the rack 70 will cause the pinion 46 to turn with it and thereby steer the wheel C. On the other hand, if the second ram 62 is reciprocated, its rack 72 will turn the pinion 46 on the opposite side of the frame and therefore steer the wheel D. In a similar way, the wheel A is steered individually by the ram 63 and the wheel B is steered individually by the ram 61. On the other hand, if the rams 60 and 62 are locked up and the third ram 64 is reciprocated, then the slide member 56 will be moved back and forth which will result in reciprocation of both racks 70 and 72, thereby steering the wheels C and D in unison at one end of the frame 10. In a similar way, the third ram 65 in FIG. 8 will steer the wheels A and B in unison at the other end of the frame.

The engines 34 and 35 drive four different pumps respectively labelled 76 through 79 inclusive in FIGS. 7 through 10. In FIGS. 7 and 8 which relate to the steering of the vehicle, the pump 76 driven by the engine 34 furnishes all of the hydraulic pressure required for the steering functions. In FIG. 7 it will be seen that a selection valve 80 has four different positions into which it can be rotated. The pressure from the pump 76, after having been modulated by the control valve 81 enters the valve 80 through a supply line, and in the position of the valve 80 as shown in FIG. 7 this valve supplies oil under pressure to the ram 61 to control the wheel B and to the ram 60 to control the wheel C, and therefore in this position the control valve 81 will steer the wheels B and C as the vehicle proceeds in the direction X as shown in FIG. 7. On the other hand, if the valve is rotated 180°, then the control valve will control the flow of oil to the rams 62 and 63 to thereby steer the wheels A and D at the other broadside end of the vehicle frame. Thus, by manipulating the valves 80 and 81 the operator in the control cab is able to steer either the front or the rear of the vehicle as it proceeds broadside, for instance, along an agricultural field.

On the other hand, if the operator wishes the vehicle to proceed endwise in the direction shown by the arrow Y in FIG. 8, then he can control the wheels in different pairs, namely the wheels A and B and the wheels C and D. He will do this by placing the control valve 81 in the center and rotating the valve 80 first to the position in which it is shown, and then to the position which is 180° opposite, thereby setting the wheels A, B, C and D straight as shown in FIG. 7. He will then rotate the valve 80 through 90° clockwise from the position in which it is shown, thereby controlling the wheels C and D using the rams 60 and 62 by which he will set the wheels C and D to the positions shown in FIG. 8. Then he will move the valve 80 counterclockwise 90° from the position shown in FIG. 7, by which he will then control the wheels A and B with the rams 63 and 61 to rotate them to the position shown in FIG. 8. The vehicle is then prepared to move in the direction of the arrow Y in FIG. 8. Having thus oriented the four wheels using the rams 60, 61, 62 and 63, he will then lock up these first and second rams, and then use the third ram 64 or 65 to steer one end of the vehicle or the other. It will be apparent by inspection of FIG. 5 that if the rams 60 and 62 are locked, reciprocation of the third ram 64 will move the slider member 56 back and forth thereby moving the racks 71 and 72 in unison to steer the wheels C and D. This steering is accomplished using the ram 64 by manipulating the control valve 85. Similarly, the control valve 88 can be used to reciprocate the third ram 65 at the other end of the vehicle to steer wheels A and D in unison. All of these steering functions using the valves 80, 81, 85 and 88 are performed using oil pressure from the pump 76, the system returning used oil to the corresponding oil reservoir 84 in the views including FIGS. 7 and 8.

Figure 9:
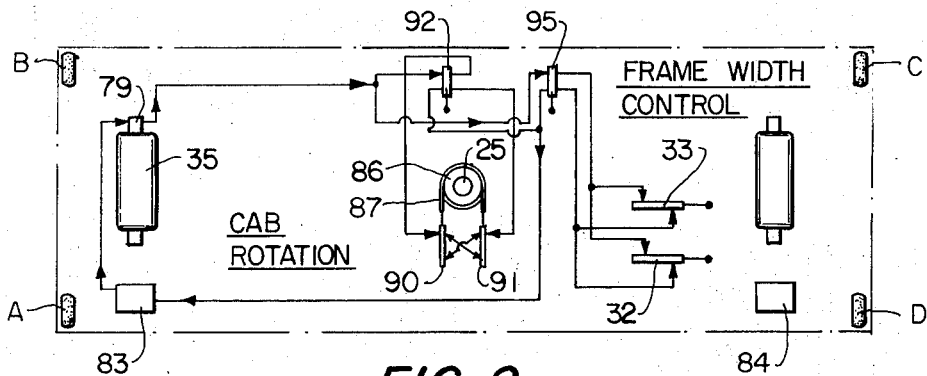
FIG. 9 is a schematic view of the hydraulic circuitry for rotating the operators cab.

FIG. 9 refers to the means for rotating the operators cab, and also the means for extending and retracting the right-hand end of the frame, and these functions are performed using the pump 79 which is driven by the left-hand engine 35, drawing oil from the reservoir 83.

As mentioned in connection with FIG. 2, the operators cab is journaled in a bearing plate 24. The cab turns on a shaft depending from it, and this shaft carries a sprocket 86 around which a flexible member 87 such as a chain is wrapped. The ends of the flexible member 87 are connected to two hydraulic rams 90 and 91 which are cross-connected in the hydraulic circuitry so that they exert a push-pull action upon the chain 87 which is of such length as to be capable of revolving the cab through 360° when the rams 90 and 91 go through their maximum motions. The oil leaving the control valves 92 and 95 returns to the reservoir 83. The control valve 92 controls the oil entering to drive the rams in one direction or the other, and it is by means of the valve 92 that the operator therefore controls the rotational position of the cab in which he is seated.

The pressure from the pump 79 is also used to control the extension or contraction of the right-hand portion of the frame as shown in FIG. 3 using the rams 32 and 33. By movement of the valve 95, the rams 32 and 33 can be controlled in unison either to expand the width of the frame or to contract it.

Figure 10:
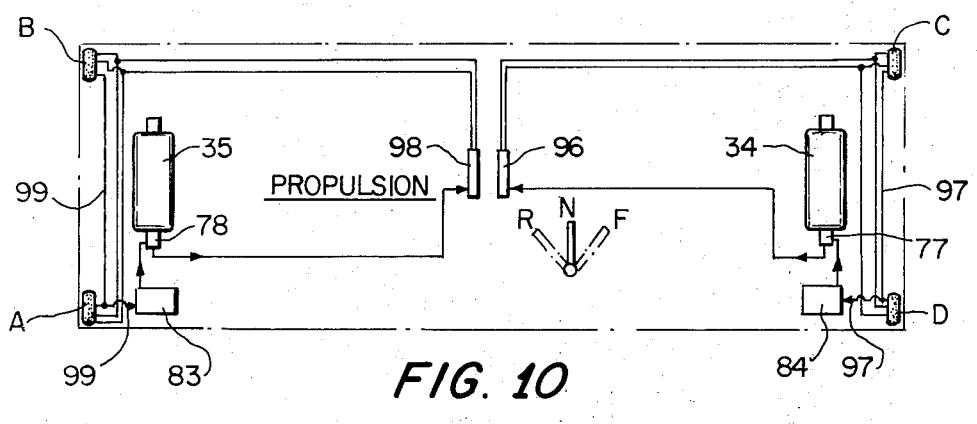
FIG. 10 is a schematic view of the hydraulic circuitry for propelling the vehicle by driving the hydraulic motors in the caster assemblies.

FIG. 10 shows propulsion vehicle means in which two hydraulic pumps drive different pairs of wheels at opposite ends of the frames. The pump 77 driven by the engine 34 drives the wheels C and D, whereas the pump 78 driven by the engine 35 supplies the pressure to drive the wheels A and B. The hydraulic fluid returns respectively to the reservoirs 84 and 83 after it has passed through the corresponding motors. The control valve 96 controls the flow of oil from the pump 77 to drive the wheels C and D either in the forward direction or in the reverse direction depending upon the position of the control valve 96, the oil returning from the motors to the reservoir 84 by way of the circuit 97. Likewise, the control valve 98 controls the flow of oil to the motors in the wheels A and B so as to drive them either in the forward direction or in the reverse direction, and the return flow of fluid from these two motors arrives at the reservoir 83 by way of the circuit 99. The straight-up positions of the valves 96 and 98 is the neutral or stopped position in which no propulsion is provided by the hydraulic motors. Since the valve 96 controls only the motors in wheels C and D the valve 98 controls only the motors in wheels A and B, when the vehicle is driven in the broadside direction as shown in FIG. 10, both control valves must be advanced equally in the same direction in order to provide balanced drive on both sides of the vehicle. However, alternatively, the control valves 96 and 98 can be placed respectively in opposite positions so that the pair of wheels at one end of the frame advances while the pair of wheels at the other end of the frame reverses, and in this case, the vehicle will sit still and rotate approximately about the center of the frame to provide a turning action in which no forward or reverse translation of the vehicle takes place.

The present invention is not to be limited to the exact form of the embodiment as shown in the drawings and described in the specification, for obviously changes may be made within the scope of the attached claims, for instance to adapt the vehicle to industrial uses instead of farming.

I claim:

1. A carrier vehicle useful for agricultural and industrial purposes, comprising;
   a. a horizontally disposed frame having corners located at its opposed ends;
   b. vertically disposed journal means at each of said corners;
   c. caster means mounted in each of the journal means and depending from the frame and each including a ground-engaging wheel supporting the vehicle, and including motor means to drive the wheel;
   d. steering means at each end of the frame and controlling the steering of the pair of weels thereat, each steering means comprising a slide member on the frame, a first and second hydraulic ram each coupled between the slide member and one of the journal means at the same end of the frame and each operative to rotate the corresponding journal means to steer the wheel, and a third hydraulic ram coupled between the slide member and the frame and operative to move the slide member back and forth across the frame to move the pair of wheels in unison;
   e. a source of hydraulic fluid under pressure carried on the frame; and
   f. hydraulic circuitry coupling the source to the rams, the circuitry including multiple steering control valves selectively operable to control in unison said first rams at opposite ends of the frame or said second rams at opposite ends of the frame to steer the vehicle when it is proceeding broadside, and including control valves operative to control said third valves to steer the vehicle when it is proceeding endwise.

2. A carrier vehicle as set forth in claim 1, wherein each caster means includes an hydraulic drive motor, and wherein said hydraulic circuitry includes multiple motor control valves, connected between the source and said motors, the valves including valve means to select the motors in pairs and valve means to control the delivery of hydraulic fluid pressure to selected motor pairs.

3. A carrier vehicle as set forth in claim 2, wherein said control valves are grouped together and mounted in locker means recessed within the frame, and said vehicle includes an operators control cab carried by the frame above the locker means and the cab including control levers; and the levers in the cab being coupled to the control valves in the locker means by flexible control cables.

4. A carrier vehicle as set forth in claim 3, wherein said cab is rotatably supported on the frame, and said vehicle further includes hydraulically actuated means mounted in the frame and coupled to rotate the cab; and cab-position control valve means mounted in the frame and coupled to a control lever in the cab.

5. A carrier vehicle as set forth in claim 4, wherein said cab is supported on a journal, and said hydraulically actuated means comprises a flexible member surrounding said journal and having its ends attached to push-pull cross-connected rams controlled by said control valve means, the limited motion of the rams limiting the total angle of rotation of the cab.

6. The carrier vehicle as set forth in claim 1, wherein each caster means includes a journal shaft extending vertically therefrom and extending upwardly through a sleeve in the journal means which is mounted in a corner of the frame, and the caster means including downwardly extending forked arms supporting between their lower ends a hydraulic vehicle drive motor, and a ground engaging wheel supported on said motor.

7. The carrier vehicle as set forth in claim 6, wherein the journal sleeve in each corner of the frame includes a pinion fixed around it opposite one of the rams coupled to the adjacent slide member, a rack engaging the pinion and attached to the ram and disposed to rotate the pinion whenever that ram is reciprocated or whenever the slide member is moved back and forth by the third ram attached between it and the frame.

8. The carrier vehicle as set forth in claim 6, wherein each journal shaft extending upwardly through a journal sleeve is longer than the sleeve and the sleeve includes shaft clamping means operative to lock the sleeve and shaft together for unitary motion, whereby the height of the vehicle above the ground can be adjusted.

9. The carrier vehicle as set forth in claim 1, wherein one end of the frame including one of the slide members and the caster means controlled thereby is separable from the other end of the frame and is telescopically attached thereto, hydraulic ram means coupled to the frame to adjust the telescoping position thereof and thereby adjust the spacing between the respective pairs of wheels located at opposite ends of the frame; and valve means for controlling the latter ram means.

10. The carrier vehicle as set forth in claim 9, wherein the frame includes peripheral members made of square tubing, and the frame including a telescoping section made of larger and smaller cross-section tubing, the latter sliding inside the former and positioned therein by said hydraulic ram means.

11. The carrier vehicle as set forth in claim 1, wherein said source of hydraulic fluid under pressure comprises two engines located symmetrically for balance on opposite sides of center of the frame, and each driving pumps for supplying said hydraulic fluid under pressure.

12. The carrier vehicle as set forth in claim 11, wherein the several different pumps are separately coupled through the said hydraulic circuitry to respectively drive different wheels and to actuate different rams through said control valves.

13. The carrier vehicle as set forth in claim 12, wherein a pump driven by one engine is connected by said hydraulic circuitry to drive the motors carried by the pair of casters at one end of the frame, and a different pump driven by the other engine is connected by said hydraulic circuitry to drive the motors carried by the pair of casters at the other end of the frame.

* * * * *